United States Patent [19]

Weissman

[11] 4,341,801
[45] Jul. 27, 1982

[54] ULTRAFILTRATION PROCESS FOR THE PREPARATION OF CREAM CHEESE

[75] Inventor: Barry J. Weissman, Norwalk, Conn.

[73] Assignee: Dorr-Oliver Incorporated, Stamford, Conn.

[21] Appl. No.: 842,654

[22] Filed: Oct. 17, 1977

[51] Int. Cl.$^3$ ............................................. A23C 9/12
[52] U.S. Cl. ...................................... 426/40; 426/41; 426/42; 426/491; 426/582; 426/583
[58] Field of Search .................. 426/40, 41, 582, 583, 426/42, 43, 491

[56] References Cited

U.S. PATENT DOCUMENTS

| | | | |
|---|---|---|---|
| 2,585,951 | 2/1952 | Malkames | 426/41 |
| 3,560,219 | 2/1971 | Attebery | 426/41 |
| 3,899,596 | 8/1975 | Stenne | 426/40 |
| 3,930,039 | 12/1975 | Kuipers | 426/41 |

OTHER PUBLICATIONS

Covacevich, Thesis–Cornell University (6-75), University Microfilm International.
Chang, "Part. Delact. Whey Used as NFDM Replace. in Cheese Proc. Foods Offers Eco. Adv.", Food Product Devel. (11-76).

*Primary Examiner*—Peter Chin
*Attorney, Agent, or Firm*—Harold M. Snyder; Burtsell J. Kearns

[57] ABSTRACT

An ultrafiltration step is used in the production of cream cheese to provide a cheese pre-mix which is cultured to form cream cheese without generating whey. The raw materials for this process include whole milk, cream and whey protein solids. The whey protein solids are substituted for the skim milk powder formerly used. Ultrafiltration yields a retentate having the butterfat and nonfat solids content required for cream cheese manufacture.

10 Claims, 2 Drawing Figures

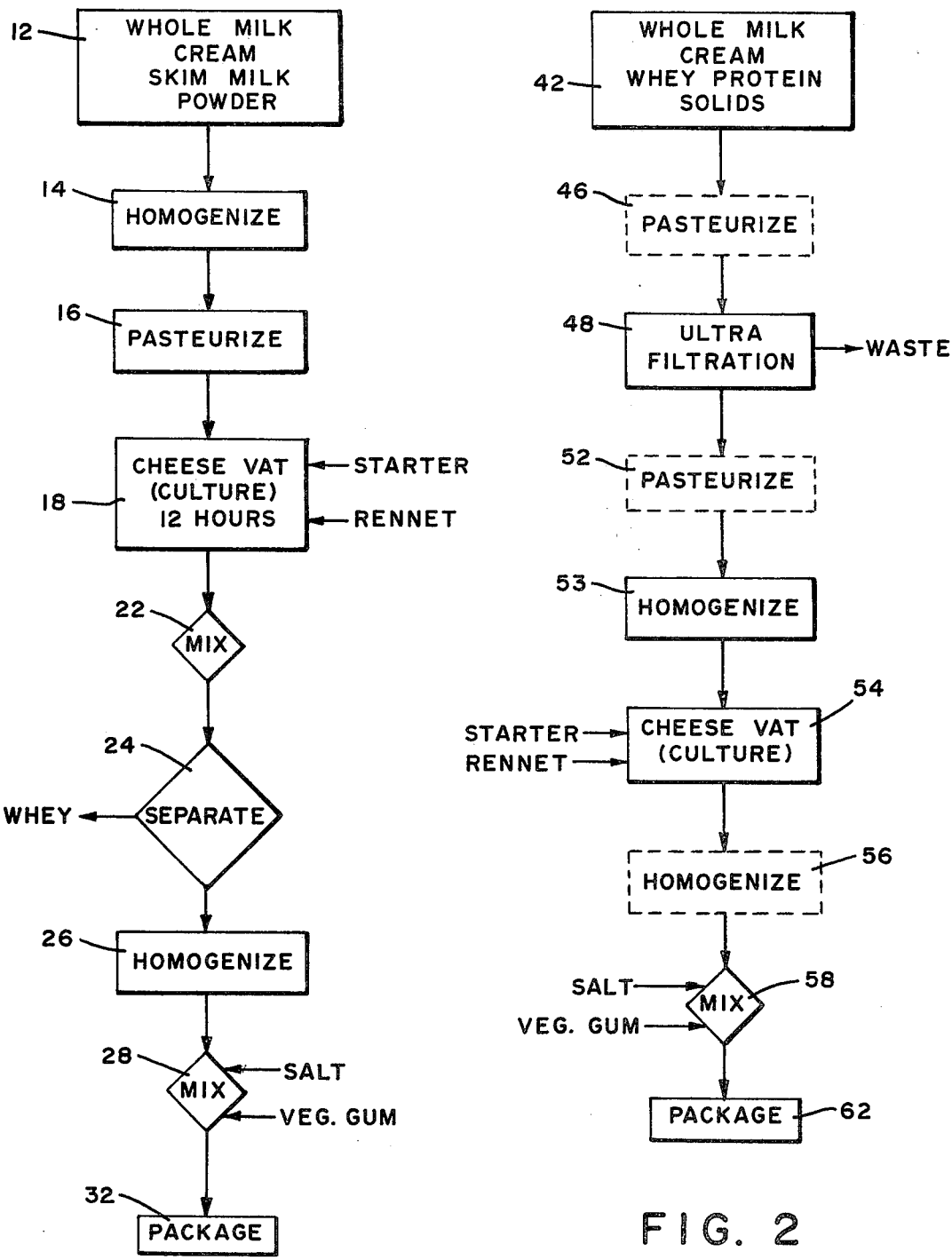

ULTRAFILTRATION PROCESS FOR THE PREPARATION OF CREAM CHEESE

This invention is directed to an improved process for the production of cream cheese.

Cheese is a product made from the curd obtained from whole, partly skimmed, or skimmed milk (usually cow's milk), with or without added cream, by coagulating the casein with rennet, lactic acid or other suitable enzyme or acid and with or without further treatment of the separated curd. The curd formed in the cheese making process is separated from the whey, which is then separately utilized or disposed of. Historically, all cheese making processes call for a step in which the whey is allowed to drain away from the curd and the last portions of whey may be removed by pressing the curd.

Nearly one-half of the solids present in the milk used in making cheese, largely the lactose, whey protein and mineral salts in the whey, are discarded in the cheese making process. It is true that a certain amount of cheese-like products; e.g., ricotta, made by coagulating the albumin in the whey with heat and acid, are produced, but in most cheese factories, the disposal of whey as waste represents a very real problem.

The production of cream cheese differs primarily from the production of other cheeses in the high level of butterfat required in the final product. Cream cheese is a soft, unripened, high fat, lactic acid type cheese made from a mixture of homogenized milk and cream. Skim milk powder (or non-fat dry milk solids or dry buttermilk solids) is also added to the mixture. Cream cheese has a rich milk acid flavor, a smooth buttery texture and a high percentage of fat. The butterfat content of the starting materials is typically in the range from 12% to 20%, by weight, depending on the process employed. The curd is precipitated by lactic acid formed by a lactic acid starter bacteria. Use of a coagulant such as rennet is optional. In the commercial process, whey is drained from the curd by centrifugal separators. The cream cheese product will have a butterfat content in the range from 33% to 40% by weight. The minimum butterfat content for cream cheese in the United States is set by governmental standards. When the milk and cream starting materials for cream cheese production have a bufferfat content of from 12% to 14%, by weight, and 7% by weight, of non-fat solids, yields usually run from 30% to 33%, where the yield is the pounds of cheese obtained per pound of starting materials expressed as a percent.

It has been shown that by providing an ultrafiltration step at an appropriate point in the process for making cream cheese, excess liquid, including certain non-fat solids, can be removed from the milk prior to the coagulation (culturing) step. Such an ultrafiltration step is highly controllable and lends itself to continuous processing. The concentrated ultrafiltered product, or retentate, is ready for treatment with lactic acid starter or rennet to produce the desired curd, but without coincident production of whey.

The function of the ultrafiltration step is to increase the concentration of butterfat and non-fat solids to the level required for cream cheese production. This has been done, in the past, by starting with whole milk and separating the whole milk into skim milk and cream fractions. The skim milk is then ultrafiltered to increase the non-fat solids content of the retentate, followed by mixing the retentate with sufficient cream and skim milk powder to form a pre-cheese mix having the proper butterfat and non-fat solids content. From this pre-cheese mix, a cream cheese closely approaching commercial quality has been made.

An alternate process for making cream cheese using ultrafiltration involves the step of blending whole milk, skim milk powder and cream and subjecting this blend to ultrafiltration. The retentate of the ultrafiltration process, which is the pre-cheese mix for the cheesemaking process, is then homogenized and cultured and additions of salt and vegetable gum may be added thereto as in the conventional process prior to packaging. Either before or after ultrafiltration, the whole milk-cream blend, in the first case, or the retentate, in the second case, is pasteurized. A further homogenization step may be employed following culturing in some cases. Skim milk powder, in amounts up to 10% by weight of the whole milk, may be used in the milk/cream blend. Buttermilk powder or non-fat dry milk solids may be substituted for the skim milk powder.

The present invention is an improvement of the process in which ultrafiltration is applied to the production of cream cheese.

It is an object of this invention to provide an improved process for making cream cheese with reduced raw materials cost in which an ultrafiltration step is utilized.

Other objects and advantages of this invention will become apparent from the following description taken in conjunction with the accompanying drawings in which:

FIG. 1 is a flow diagram of the conventional cream cheese making process and

FIG. 2 is a flow diagram of the preferred cheese making process of the present invention.

One process for making cream cheese in accordance with the present invention calls for the production of an ultrafiltered pre-cheese mix from a feed comprising whole milk, cream, and whey protein solids, the latter in an amount up to 10% by weight of the whole milk. The whey protein solids thus replace the milk solids, dry buttermilk solids or non-fat dry milk solids ordinarily added to the milk/cream blend. The whey protein may be provided as reconstituted whey protein powder or as a concentrate obtained from an ultrafilter processing normal plant whey.

In another process of the invention, whole milk is separated into skim milk and cream, the skim milk is ultrafiltered to concentrate the non-fat solids, the concentrate, cream and whey protein solids are then blended to form a pre-cheese mix having predetermined butterfat and non-fat dry solids content and this pre-cheese mix is then cultured, additives such as salt and vegetable gum are introduced into the mix and the product is then ready for packaging.

Whey protein solids are produced by the ultrafiltration of whey. In the ultrafiltration process, the whey protein solids are retained by the ultrafiltration membrane forming a concentrate, whereas the lactose and mineral salts of the whey pass through the membrane. The lactose and mineral salt permeate is then wasted, the volume of the permeate being somewhat less than the original whey feed stream.

The whey protein solids do not participate in the enzymatic reaction initiated by the addition of starter materials in the cheese-making process; i.e., they do not form curds as do the milk and cream constituents of the blend. Because at this point in the process there is little or no liquid present to serve as a vehicle for the whey protein solids, they are trapped in the coagulant. The whey protein solids adhere to the curds formed during coagulation and so add their bulk to the cheese curds. Thus, whey protein solids, formerly a waste material, is made to provide the required level of non-fat solids in the cream cheese.

The use of whey protein in the feed blend provides two significant advantages: (1) it provides low cost non-fat solids (particularly when the whey solids are produced in an ultrafilter treating plant whey) necessary to the production of cream cheese and (2) it introduces a useful application of cheese whey, the disposition of which is a significant environmental problem of national proportion.

In the conventional cream cheese making process illustrated in the flow diagram of FIG. 1, whole milk, cream and skim milk powder are mixed in a blending stage 12. The blend then flows to a homogenization stage 14 in which the fat globules are reduced in size and evenly distributed throughout the blend. Following homogenization the homogenized blend flows to a pasteurization stage 16. The pasteurization step may be conveniently conducted in the temperature range from about 160° F. to about 165° F. for a period from about 14 seconds to 16 seconds. Following pasteurization the pasteurized blend is removed to a cheese vat 18 and a lactic acid starter, for example, streptococcus cremoris to streptococcus lactis, is added for culturing. Rennet may also be added, if desired. The curds remain in the cheese vat 18 for about 12 hours at a temperature of about 85° F. Following culturing the curd is mixed to promote uniformity of the product. Separation stage 24 follows and in this stage the whey is separated from the curd. The separation may be carried out by placing the curd on cloths which allow the whey to drain away. Alternatively, the curd can be poured into muslin bags which are then placed on draining racks. If it is desired to hasten draining, pressure may be applied near the end of the draining period. In another method, the hot curd is passed through a special centrifugal machine which mechanically removes the whey. The cheese is then forwarded to a second homogenization stage 26 to form a uniform product and then the cheese is mixed with salt and vegetable gum for stabilization in stage 28 before it is forwarded to the packaging stage 32.

A cream cheese making process utilizing ultrafiltration and incorporating the present invention is illustrated in the flow diagram of FIG. 2. In this process, whole milk, whey protein solids, and cream are mixed in stage 42. At this point the blended whole milk and cream mixture is routed to the pasteurizing step 46. The pasteurizing stage 46 prior to the ultrafiltration stage 48 is optional at this point in the process and the operator may elect to carry out this procedure in a pasteurizing step 52 following the ultrafiltration stage 48. In any case, the blended mixture, pasteurized or unpasteurized, is routed to the ultrafiltration stage 48 and the ultrafiltration process is conducted on a flow stream which is at a temperature of about 120° F. The product of the ultrafiltration stage is a retentate, much enriched in butterfat content and in non-fat solids content, and a permeate which contains essentially no butterfat and a reduced non-fat solids content.

Following ultrafiltration, the retentate is forwarded to the pasteurization stage 52 (if it has not been carried out previously) and then to a homogenization stage 53. Homogenization is followed by a culturing stage 54 where lactic acid starter is added and rennet also, if desired, into the cheese vat. A temperature of about 85° F. is maintained in the cheese vat for a period of about 8 hours. When the culturing step has been completed, the cream cheese may optionally be treated in a further homogenization stage 56, but, in any case, the cheese is directed to a mixing stage 58 in which salt and vegetable gum are added, and then to the packaging stage 62. The optional homogenization stage 56 may alternatively be conducted following the mixing stage 58 to assure that the final product is quite uniform.

An ultrafiltration system suitable for the purposes of this invention includes ultrafiltration cartridges which consist of a number of membrane-coated panels arranged in spaced relation to form feed channels through the cartridges. Each of the membrane-coated panels is composed of a porous core material while the ultrafiltration membrane is composed of a suitable polymer. A portion of the liquid and other constituents below a predetermined size pass through the membrane, into the porous core material from which they may be removed as permeate. The liquid remaining in the channels thus becomes more concentrated with respect to constituents above the predetermined size range before leaving the ultrafiltration stage.

The membrane applied in the ultrafiltration cells may be of a cellosic type or the anisotropic, microporous, polymeric, high flux, low pressure membrane of the type disclosed in U.S. Pat. No. 3,615,024, issued Oct. 26, 1971 to A. S. Michaels. The membranes may be composed in accordance with the above patent of polymers such as polycarbonates, polyvinylchlorides, polyamides, acrylic resins, polystyrene, styreneacrylonitrile, polysulfones, acetal polymers and various copolymers. The average pore size of such a membrane may advantageously be in the range from 20 A. to 100 A., and certain satisfactory working membranes have a nominal average pore size range of 30 A to 50 A.

The formulation of polymeric materials which will function in a satisfactory manner as ultrafiltration membranes are well known. For example, coatings of acrylic and epoxy resins may be formed. Such polymeric materials are disclosed in U.S. Pat. No. 3,366,563, issued Jan. 30, 1968, U.S. Pat. No. 3,369,983 issued Feb. 20, 1968, and U.S. Pat. No. 3,403,088, issued Sept. 24, 1968. Suitable materials for the membrane core include resin-impregnated paper or cardboard, resin bonded granular solids, open foamed plastic, glass or plastic fiber mat and sintered plastic.

The following examples are offered to illustrate the advantages of the invention. In these examples it will be understood that the percentages of the constituents given refer to percent by weight.

EXAMPLE I

A feed mix is prepared consisting of milk (3.9% butterfat), cream (40% butterfat) and whey protein concentrate (dry—35% protein). The weight ratio of milk to cream is 1.10. Sufficient whey powder is added so as to comprise 2.55% of the feed mix. The mix composition is:

| | |
|---|---|
| 29.5% | Total solids |
| 20.6% | Butterfat |
| 3.2% | Protein |

| | |
|---|---|
| 8.9% | Non-fat solids |

The feed mix is concentrated by ultrafiltration to obtain a pre-cheese mix composition of approximately 37.0% butterfat. Starter is then added to the pre-cheese mix in proportion to 5% of the original feed mix. The mix is allowed to set (culturing) for from 8 to 10 hours at a temperature of 85° F. Salt and gum are added to the coagulum in proportion to 0.7% of the original feed mix to yield a final cream cheese composition of 33.5% butterfat and 12.0% non-fat solids.

EXAMPLE II

A feed mix is prepared consisting of milk (3.9% butterfat), cream (40% butterfat) and whey concentrate (8.4% total solids). The whey concentrate is obtained by ultrafiltration of plant whey at about a five-fold concentration ratio. The weight ratio of milk to cream in the feed mix is 1.10. The whey concentrate is added in an amount sufficient to comprise 23.5% of the feed mix. The mix composition is:

| | |
|---|---|
| 23.1% | Total solids |
| 16.1% | Butterfat |
| 2.5% | Protein |
| 7.0% | Non-fat solids |

The feed mix is concentrated by ultrafiltration to obtain a pre-cheese mix composition of about 37% butterfat. Starter is added to the concentrate in proportion to 3.9% of the original feed mix. The mix is allowed to set for from 8 to 10 hours at 85° F. Salt and gum are added to the coagulum in proportion to 1% of the original feed mix to yield a final cream cheese composition of 33.2% butterfat and 11.8% non-fat solids.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. In a process for making cream cheese from raw materials comprising milk and cream wherein at least a portion of the raw materials are subjected to ultrafiltration and the rententate thereof is employed in a pre-cheese mix which is subsequently cultured and stabilized, the improvement comprising, introducing into the pre-cheese mix prior to ultrafiltration an addition of whey protein solids.

2. In a process for making cream cheese from a feed including whole milk and cream, wherein at least a portion of said feed is an ultrafiltered retentate, to produce a pre-cheese mix having predetermined butterfat and non-fat solids content, wherein said pre-cheese mix is cultured to produce a coagulum, and the coagulum mixed with stabilizers and salt prior to packaging, the improvement comprising adding whey protein solids to the material undergoing treatment prior to the culturing step.

3. The process of claim 2 wherein said whey protein solids are added to a blend of whole milk and cream and the blend thus formed is subjected to ultrafiltration.

4. The process of claim 3 wherein said whey protein solids are added in an amount up to 10%, by weight, of said whole milk.

5. The process of claim 4 wherein said whey protein solids are added in powder form.

6. The process of claim 4 wherein said whey protein solids are added as a concentrate.

7. The process of claim 2 wherein the whole milk is separated into skim milk and cream fractions and the skim milk fraction is subjected to ultrafiltration, the ultrafiltered retentate then being mixed with cream and whey protein solids to form said pre-cheese mix.

8. The process of claim 7 wherein said whey protein solids are added in an amount up to 10%, by weight, of said whole milk.

9. The process of claim 8 wherein said whey protein solids are added in powder form.

10. The process of claim 8 wherein said whey protein solids are added as a concentrate.

* * * * *